(12) United States Patent
Bak et al.

(10) Patent No.: US 9,292,591 B2
(45) Date of Patent: Mar. 22, 2016

(54) VISUAL ANALYTICS FOR SPATIAL CLUSTERING

(71) Applicant: International Business Machines Corporation, Armonk, NY (US)

(72) Inventors: Peter Bak, Haifa (IL); Eli Packer, Givataim (IL); Harold Jeffrey Ship, Mitzpe Netofa (IL)

(73) Assignee: International Business Machines Corporation, Armonk, NY (US)

(*) Notice: Subject to any disclaimer, the term of this patent is extended or adjusted under 35 U.S.C. 154(b) by 191 days.

(21) Appl. No.: 14/145,940

(22) Filed: Jan. 1, 2014

(65) Prior Publication Data

US 2015/0186499 A1 Jul. 2, 2015

(51) Int. Cl.
*G06F 17/00* (2006.01)
*G06F 17/30* (2006.01)

(52) U.S. Cl.
CPC ................ *G06F 17/30601* (2013.01)

(58) Field of Classification Search
CPC ............ G06F 17/30241; G06F 17/30; G06F 17/30259; G06F 17/30312; G06F 17/3053; G06F 17/30598; G06F 17/11; G06F 17/30061; G06F 17/3023; G06F 17/30244; G06F 17/3025; G06F 17/30256; G06F 17/30268
See application file for complete search history.

(56) References Cited

U.S. PATENT DOCUMENTS

2009/0082997 A1* 3/2009 Tokman ............... G06K 9/6224
702/179
2014/0064581 A1* 3/2014 Madabhushi ........ G06K 9/6256
382/128

OTHER PUBLICATIONS

Estivill-Castro et al., "Amoeba: Hierarchical clustering based on spatial proximity using delaunay diagram", In Proceedings of the 9th International Symposium on Spatial Data Handling. Beijing, China (2000).
Mu et al., "A Heuristic Alpha-Shape Based Clustering Method for Ranked Radial Pattern Data", Applied Geography, vol. 31, Issue 2, Apr. 2011, pp. 621-630.
Guo et al., "ICEAGE: Interactive Clustering and Exploration of Large and High-Dimensional Geodata", Journal of Geoinformatica ,vol. 7 Issue 3, Sep. 2003 , pp. 229-253.
Lucieer et al., "Alpha-Shapes for Visualizing Irregular-Shaped Class Clusters in 3D Feature Space for Classification of Remotely Sensed Imagery", Proceedings of SPIE 5295, Visualization and Data Analysis 2004, 201 (Jun. 4, 2004).
Yin et al., "Gamma-Partition: A Clustering Method for Spatial Point Pattern Analysis", Geographical Analysis, vol. 42, 2010.

* cited by examiner

*Primary Examiner* — Truong Vo

(57) ABSTRACT

A computerized clustering method. The method comprises receiving a spatial point dataset comprising a plurality of spatial points in a space, heuristically calculating, using a processor, a plurality of α-shape based segmentations such that each of the plurality of α-shape based segmentations defines a plurality of polygonal areas that cluster the plurality of spatial points in a plurality of clusters which collectively bounds the plurality of spatial points, presenting to an operator in each sequential iteration of a plurality of sequential iterations another of the plurality of α-shape based segmentations, and selecting by the operator one or more of the plurality of α-shape based segmentations.

20 Claims, 8 Drawing Sheets

VISUAL ANALYTICS FOR SPATIAL CLUSTERING

BACKGROUND

The present invention, in some embodiments thereof, relates to data presentation and, more specifically, but not exclusively, to methods and systems of clustering spatial points distributed in a space.

During the last years, the availability of locational data mapping spatial attributes grows due to the abundance of location services, such as Global Positioning System (GPS) or cellular based location services of mobile devices. The need for analysis of such a locational data respectively increases. Spatial data analysis may be applied in varied domains such as tourism, municipal service, safety and security force planning, emergency management, and/or epidemiology.

Spatial data analysis takes into account arbitrary distribution, noise, and a large quantity of events buried in data.

A common tool to assist analysts with locational data is clustering. Currently available algorithms for clustering are based on user defined input parameters.

SUMMARY

According to some embodiments of the present invention, there is provided a computerized clustering method. The method comprises receiving a spatial point dataset comprising a plurality of spatial points in a space, heuristically calculating, using a processor, a plurality of α-shape based segmentations such that each of the plurality of α-shape based segmentations defines a plurality of polygonal areas that cluster the plurality of spatial points in a plurality of clusters which collectively bounds the plurality of spatial points, presenting to an operator in each sequential iteration of a plurality of sequential iterations another of the plurality of α-shape based segmentations, and selecting by the operator at least one of the plurality of α-shape based segmentations.

Optionally, the heuristically calculating comprises calculating Delaunay triangulation on the spatial point dataset and calculating a plurality of α-shapes based on the Delaunay triangulation, wherein each of the plurality of α-shape based segmentations is defined according to another of the plurality of α-shapes.

Optionally, the heuristically calculating comprises selecting at least one of the plurality of α-shape based segmentations such that a corresponding geometric graph that represents a respective α-shape contains only simple polygonal cycles.

Optionally, the heuristically calculating comprises dividing the plurality of α-shape based segmentations to a plurality of topologically equivalent classes; selecting one member of the plurality of topologically equivalent classes; wherein the presenting comprises presenting to the operator in each sequential iteration of the plurality of sequential iterations another the member.

Optionally, the presenting comprises receiving from the operator instructions to adapt a topology of at least one of the plurality of polygonal areas.

More optionally, the presenting comprises generating a visual feedback to the instructions.

Optionally, the plurality of spatial points are plurality of objects located on a map.

Optionally, the heuristically calculating comprises selecting at least one of the plurality of α-shape based segmentations such that a corresponding α value of a respective α-shape that bounds at least one of the plurality of clusters is minimal.

Optionally, the heuristically calculating comprises selecting at least one of the plurality of α-shape based segmentations such that a corresponding α value of a respective α-shape defined by a minimum number of polygonal cycles has at least one of the plurality of clusters is minimal.

Optionally, the heuristically calculating comprises selecting at least one of the plurality of α-shape based segmentations such that a corresponding α value of a respective α-shape that bounds at least one of the plurality of clusters is maximal.

Optionally, the heuristically calculating comprises heuristically calculating a second of the plurality of α-shape based segmentations based on topological features of respective the plurality of clusters a first of the plurality of α-shape based segmentations.

Optionally, the heuristically calculating comprises heuristically calculating a second of the plurality of α-shape based segmentations based on geometric features of respective the plurality of polygonal areas a first of the plurality of α-shape based segmentations.

Optionally, each one of the α-shape based segmentations bounds a respective cluster from the plurality of clusters and visually marked to indicate spatial points density in the respective cluster.

Optionally, the computerized method further comprises allowing a user to select any of the plurality of α-shape based segmentations before presenting at least one subsequent α-shape based segmentation from the plurality of α-shape based segmentations.

According to some embodiments of the present invention, there is provided a clustering system. The clustering system comprises an input module which receives a spatial point dataset comprising a plurality of spatial points in a space, a processor, a clustering module which uses the processor for calculating a plurality of α-shape based segmentations such that each of the plurality of α-shape based segmentations defines a plurality of polygonal areas that cluster the plurality of spatial points in a plurality of clusters which collectively bounds the plurality of spatial points, and a user interface module which presents to an operator in each sequential iteration of a plurality of sequential iterations another of the plurality of α-shape based segmentations and allows the operator to select at least one of the plurality of α-shape based segmentations.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
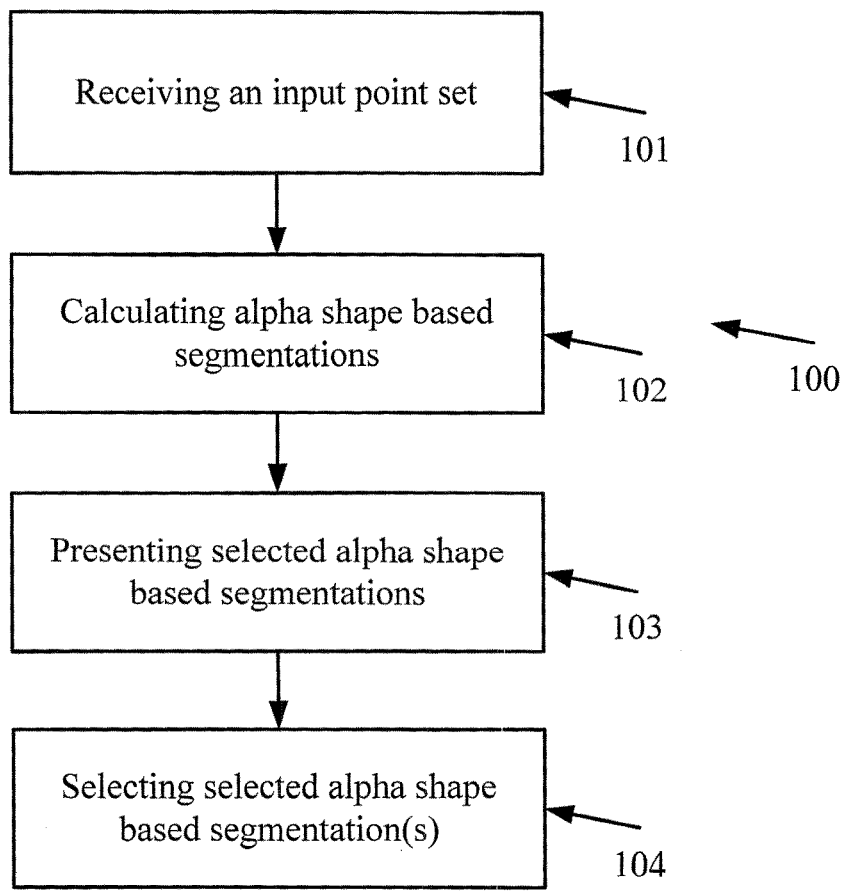
FIG. 1 is a flowchart of a computerized method of generating and presenting optional spatial point segmentation(s) of a space containing a set of spatial points based on α shape based heuristic calculations each includes polygonal areas, according to some embodiments of the present invention.

The present invention, in some embodiments thereof, relates to data presentation and, more specifically, but not exclusively, to methods and systems of clustering spatial points distributed in a space.

According to some embodiments of the present invention, there are provided methods and systems of segmenting a set of spatial points based on α-shape based heuristic calculations. The calculations allow generating an iterative user controlled visualization of optional spatial point segmentation(s) of the space that contains the set of spatial points. In such a manner, a visual analytics solution that uses heuristics to suggest algorithmic settings for exploration is provided. This solution results in a presentation of different arrangements of clusters where borders of bounding areas where the shaping of the bounding areas is conducted are displayed using α shape data structure process(es).

Optionally, the spatial point segmentation(s) are presented on a user interface that allows the operator to input instructions which are used for guiding the process.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination to of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet to using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart of a computerized method 100 of generating and presenting optional spatial point segmentation(s) of a space containing a set of spatial points based on α-shape based heuristic calculations each includes polygonal areas, according to some embodiments of the present invention. Each polygonal area bounds a cluster of spatial points from the set of spatial points such that all polygonal areas collectively bound all the spatial points.

Optionally, the method includes an iterative clustering procedure wherein to the operator may view the hierarchy of clustering levels during an exploration session.

In such embodiments, the method 100 provides a visual analytics solution for hierarchical spatial clustering. The method may enable an operator to change input parameters to receive immediate visual feedback for the algorithmic performance and/or to reduce noise solution to hierarchical spatial clustering.

Optionally, the results obtained with the heuristic calculation embed a set of topological and/or geometric features. The topological features are sets of disjoint simple polygons (the boundary does not self-intersect). Some of these polygons may contain holes. Moreover, some of the polygons may reside within holes of other polygons. This topological feature may cascade such that polygons may reside within holes of other polygons which in turn may reside within holes of other polygons. The geometric features are areas bounded inside closes polygonal boundaries where other closed polygonal boundaries may constitute holes which cut areas from the interior. For example, FIG. 4 demonstrates the above discussed geometric and topological features. Optionally, the topological and/or geometric features are bound or redefined by a domain and/or operator inputs. Optionally, the generated visualization is based on a heat map view marking polygonal areas based on cluster hierarchies.

Figure 2:
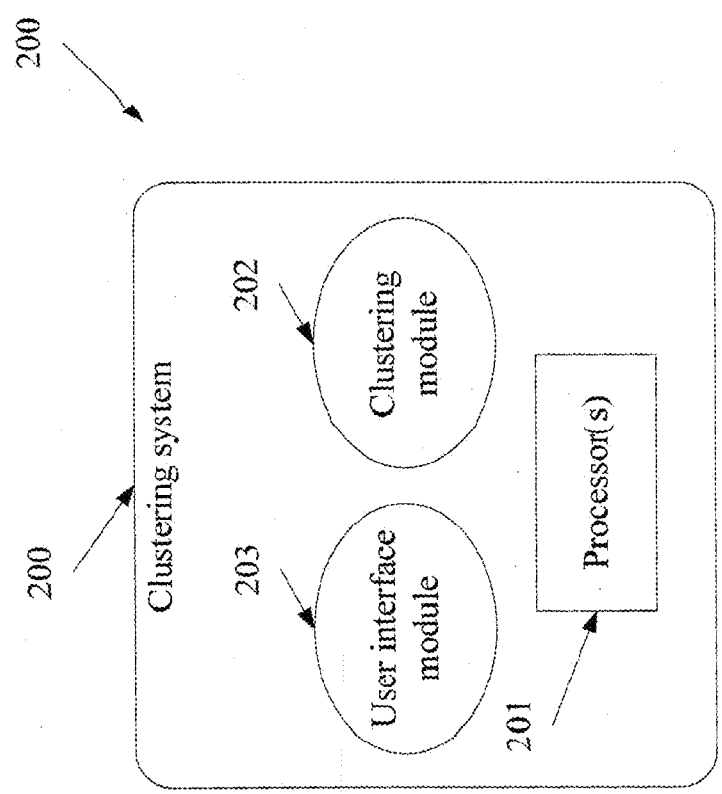
FIG. 2 is a schematic illustration of a clustering system of generating presentation(s) of spatial point clusters(s) based on heuristic calculations of α shapes, for instance implementing the method depicted in FIG. 1, according to some embodiments of the present invention.

Reference is also made to FIG. 2, which is a schematic illustration of a clustering system 200 of generating presentation(s) of spatial point clusters(s) based on heuristic calculations of α-shapes, for instance implementing the method depicted in FIG. 1, according to some embodiments of the present invention. The clustering system 200 includes one or more processor(s) 201, a clustering module 202 for clustering spatial points based on an α-shape calculation, as outlined above and described below, and a user interface (UI) module 203 for generating a UI that may be rendered to an operator to present, iteratively, a plurality of α-shape based segmentations, for example as outlined above and described below.

First, as shown at 101, a spatial point dataset that includes a plurality of spatial points located in a space is received. Each spatial point may be indicative of a location an event, an object, a person, for instance in a certain point in time and/or a period, and/or any other element.

Now, as shown at 102, α-shape based segmentations are calculated, optionally heuristically, in a plurality of sequential iterations, for example by the to clustering module 202 using the processor 201. Each α-shape based segmentation defines an α-shape defining a plurality of polygonal areas. Each of the polygonal areas bounds a cluster of the spatial points such that all the polygonal areas collectively contain all the inputted spatial points.

As shown at 103, in some or all of the sequential iterations, a calculated α-shape based segmentation is generated and presented to the operator, for instance as described below. Optionally, the presentation includes an illustration of the polygonal areas forming the calculated α-shape where each one of the polygonal areas is visually marked to indicate spatial points density in respective cluster of spatial points it bounds. As shown at 104, one or more of the calculated α-shape based segmentations are selected by an operator.

Figure 3:
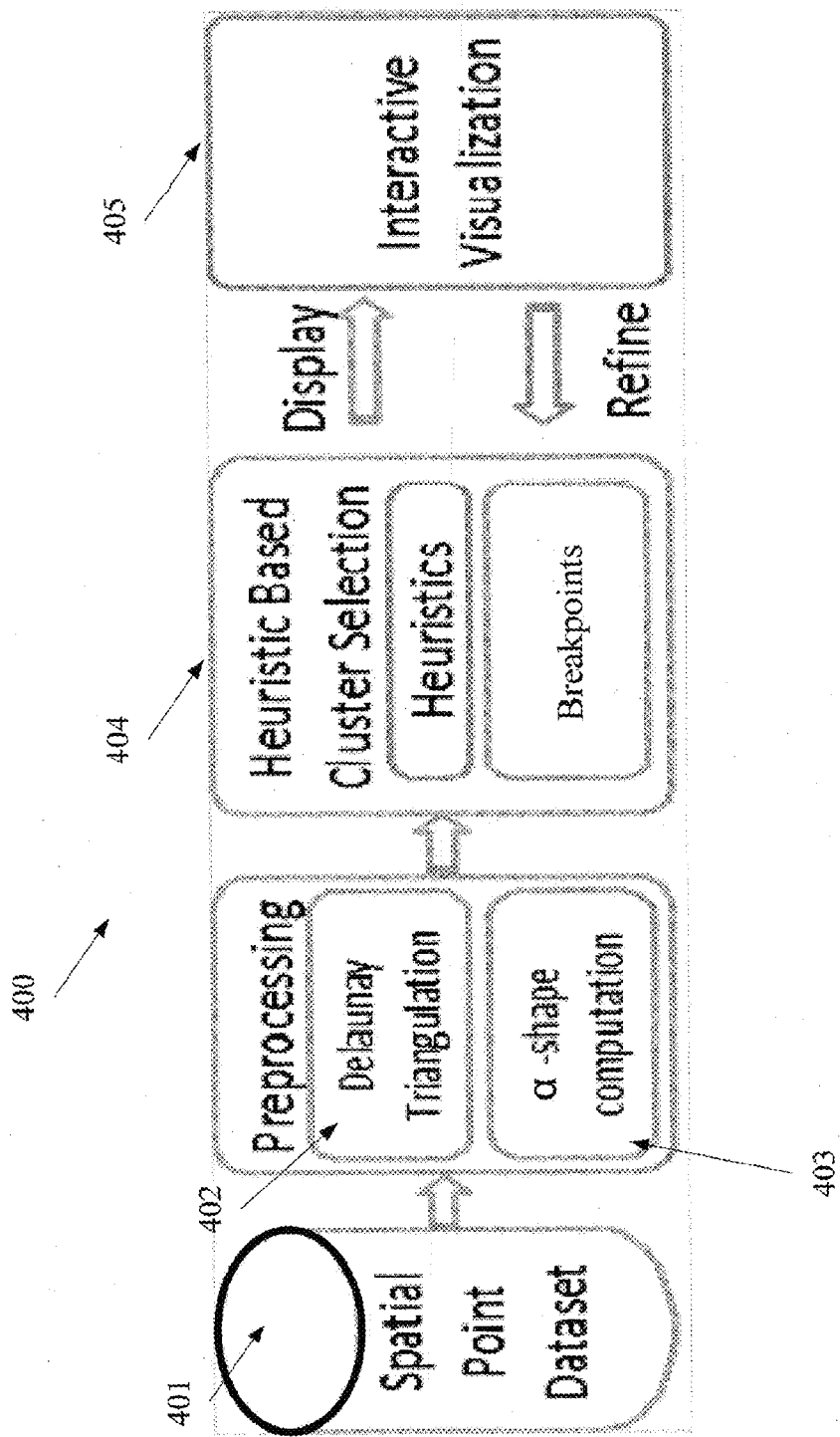
FIG. 3 is a schematic illustration of an exemplary algorithmic flow of an implementation of the heuristic iterative calculation of α-shape based segmentations and the presentation(s) thereof, according to some embodiments of the present invention.

Reference is now made to FIG. 3, which is a schematic illustration 400 of an exemplary algorithmic flow of an implementation of the heuristic iterative calculation of α-shape based segmentations and the presentation(s) thereof, according to some embodiments of the present invention.

First, as described above and shown at 401, a spatial point dataset is selected and/or received, for example stored in an accessible database.

As shown at 402, based on Delaunay triangulation, denoted as T, on the spatial point dataset, α-shapes are formed. T is performed on the spatial point dataset, denoted as p, such that each edge, denoted as e, is associated with a numeric interval $[e_1;e_2]$. In such a manner, the edge belongs to the α-shape if only if $\alpha \in [e1;e2]$, see H. Edelsbrunner, D. G. Kirkpatrick, and R. Seidel. *On the shape of a set of points in the plane.* IEEE Trans. Inform. Theory IT-29, pages 551-559, 1983. Note that the α-shape is a generalization of a convex hull; when α, the number of input points, approaches ∞, the α-shape converges to the convex hull. As α decreases the α-shape shrinks.

As shown at 403, α-shapes are computed. For example, for each $e \in T(P)$, corresponding interval is found where e belongs to the α-shape. This may be done locally by analyzing adjacent triangles, as described in H. Edelsbrunner, D. G. Kirkpatrick, and R. Seidel. *On the shape of a set of points in the plane. IEEE Trans. Inform. Theory IT-29*, pages 551-559, 1983. The endpoints of the intervals define a set S of α-shapes based segmentations, a shape steps where each step $s \in S$ corresponds to a different α-shape, for example a change from a previous α-shape, either an addition or a removal of an edge. The α-shape based segmentations of S are sorted, for example in an increasing order. Simulating the steps in this order generates an iterative procedure that traverses all possible α-shapes for P. In these embodiments, the first α-shape includes no edges and the last one coincides with the convex hull. 403 and 402 are optionally performed as a preprocessing procedure, before α-shape based segmentations are filtered for presentation to a user.

As shown at 404, some of the α-shape based segmentations of S are selected for presentation to the operator. Optionally, some of the calculated α-shape based segmentations are marked as candidate clustering arrangements for the operator. These candidates, denoted as B ⊆ S and referred to herein as breakpoints, are optionally presented to the operator. Each breakpoint b ∈ B encodes a cluster of spatial points into polygonal areas having certain shapes, forming together an α-shape. Optionally, the clusters and the shapes of the bounding polygonal areas associated with each of the breakpoints are the α-shape based segmentations presented to the operator.

The breakpoints are optionally selected based one or more heuristics which are applied on S, which optionally arranged in an increasing order. Optionally, each point is associated with a cluster containing the spatial point where for each edge added; the clusters of its endpoints are iteratively merged. No splits are performed to when edges are removed such that once an edge is processed, its endpoints are in the same cluster until the process terminates. In particular, when processing the steps, the number of clusters decreases, while the size of the clusters increases. Upon terminating, a single cluster that contains all points remains.

Optionally, breakpoints are selected only after each p ∈ P is a part of an added edge. It follows that each point belongs to a cluster of at least two points when breakpoints are selected. In such a manner, clusters in which isolated points make up one-point clusters are avoided.

Optionally, α-shape based segmentation is selected as a breakpoint when a corresponding geometric graph that represents a respective α-shape contains only simple polygonal cycles. In such embodiments, the degree of all vertices of the respective α shape is 0 or 2. Optionally, the geometric graph is planar, and therefore no cycle intersection is introduced. From those polygonal cycles and the characteristics of the a shape structure, associated polygons are detected as follows: Polygonal cycles which are not contained within any other polygonal cycles are the boundaries of polygonal areas and cycles immediately inside other polygonal cycles are set as holes of these polygonal areas. Cycles inside holes are associated with other polygonal areas, and so on. It follows that each polygonal area may have one or more holes, and polygonal areas may surround other polygonal areas. The reason for considering such breakpoints is that respective geometric and topological interpretations, as described above, cover the entire set of points, giving them suitable shapes.

Figure 4A:
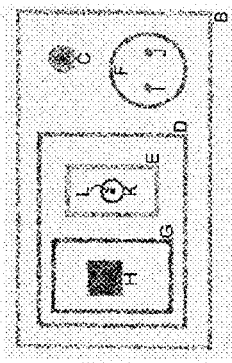
FIGS. 4A-4L are schematic illustrations α-shapes which are selected as breakpoints on a certain spatial points dataset, according to some embodiments of the present invention.
Figure 4B:
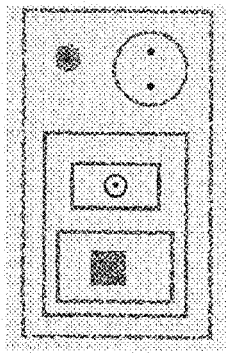
Figure 4C:
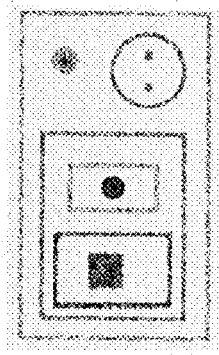
Figure 4D:
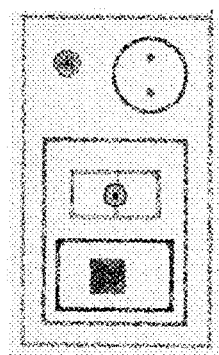
Figure 4E:
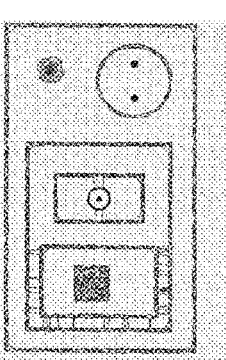
Figure 4F:
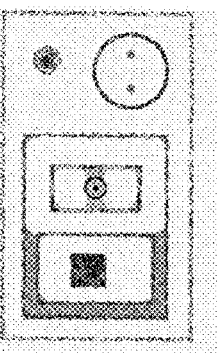
Figure 4G:
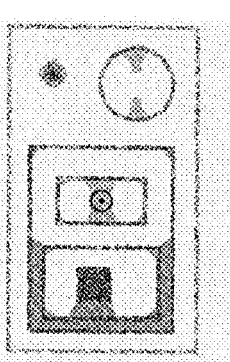
Figure 4H:
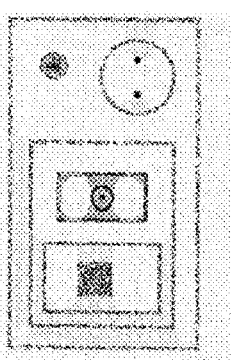
Figure 4I:
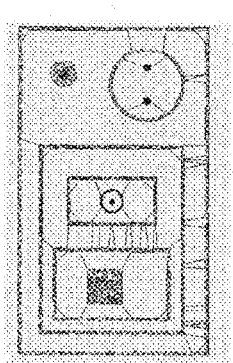
Figure 4J:
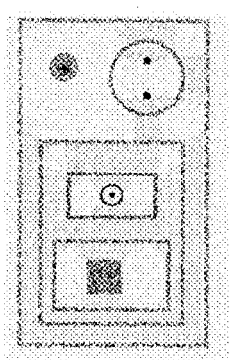
Figure 4K:
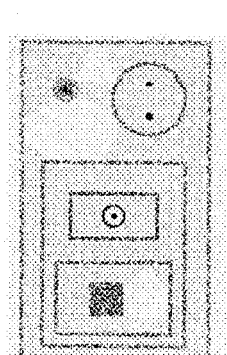
Figure 4L:
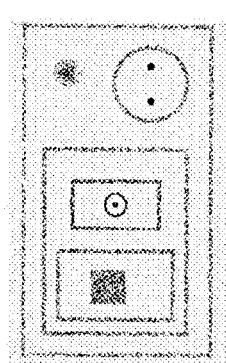
Figure 4M:
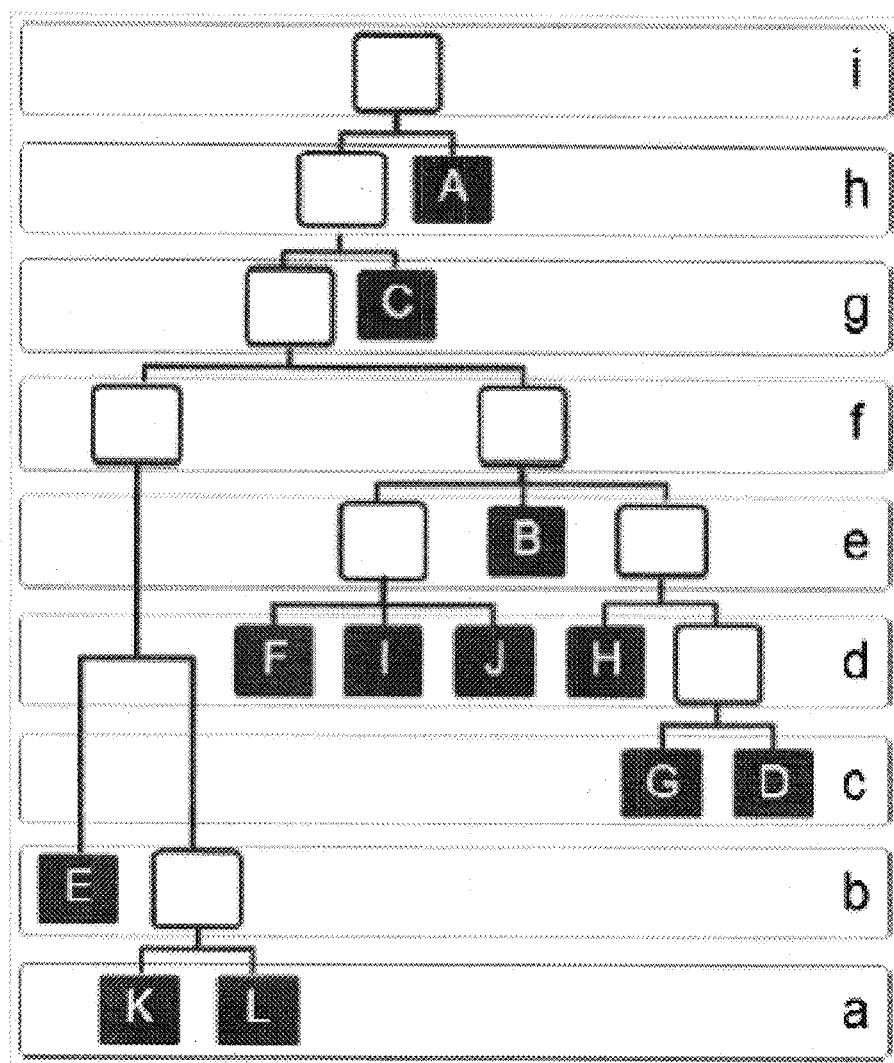
FIG. 4M is a schematic illustration of a tree depicting the hierarchy among clusters in the α-shapes which are selected as breakpoints on a certain spatial points dataset, according to some embodiments of the present invention.

FIGS. 4A-4L illustrates α-shapes which are selected as breakpoints on a certain spatial points dataset. Each one of FIGS. 4A-4L depicts a visualization which illustrate polygonal areas obtained for exemplary α-shape based segmentation where to each color corresponds to a common cluster, according to some embodiments of the present invention. For instance, FIG. 4A depicts capturing all 12 clusters, FIG. 4B depicts how clusters K and L are joined, FIG. 4C depicts how clusters K and L and E are joined together, FIG. 4C depicts how clusters G and D are joined, FIG. 4D depicts how clusters K and L are joined, FIG. 4E depicts how centers of clusters are connected to surrounding, FIG. 4F depicts how clusters G and F and B are joined together, FIG. 4G depicts clusters B and C disjoint, FIG. 4H depicts how cluster B contain all inner clusters, and FIG. 4I depicts a convex hull containing all spatial points (and clusters). For this example, FIG. 4M depicts a tree wherein each node symbolizes an optionally area of FIGS. 4A-4L covering a cluster of spatial points. Each level in the tree corresponds with another cluster set. For example, row e corresponds with three clusters. Each cluster contains the spatial points of the (sub) clusters whose identification (ID) resides on the sub tree of the node (represented by filled square).

Figure 5C:
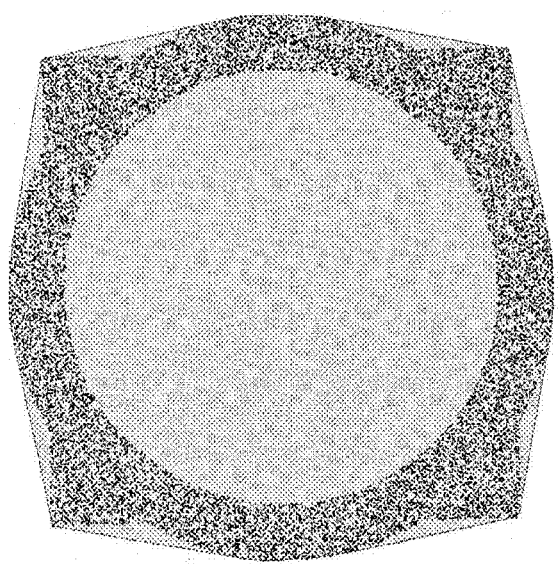
FIGS. 5A-5C are examples of breakpoint selection options, according to some embodiments of the present invention.
Figure 5B:
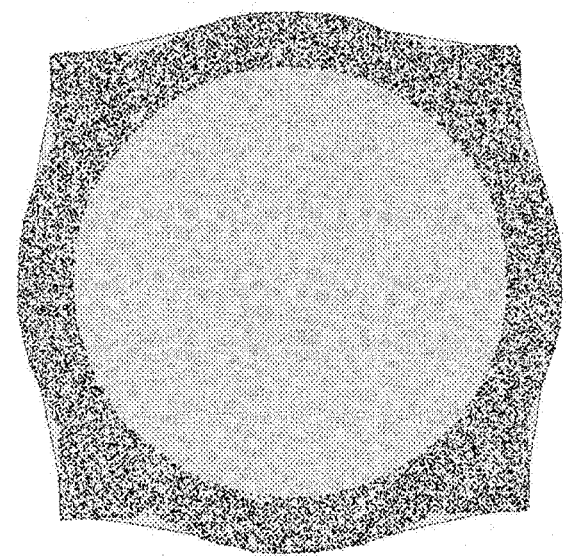
Figure 5A:
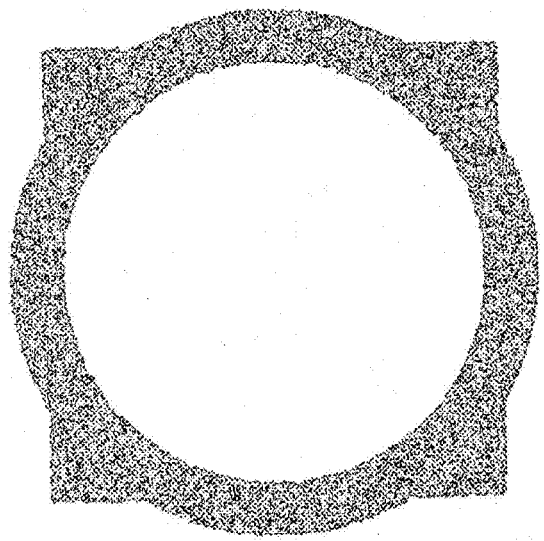

Optionally, α-shape based segmentations are divided into topologically equivalent classes where breakpoints of the same class have a common partition to clusters and a different α-shape. From each topologically equivalent class a breakpoint is selected, optionally by using one or more of following three options:

The α-shape segmentation having the minimum α among the α-shapes that bound the same spatial points—having a shape that fits tightly the spatial points to avoid voids as much as possible. For example see FIG. 5A.

The α-shape segmentation having a minimum α with which the minimum number of polygonal cycles is obtained (in other words, the minimum number of holes)—simplifying the α-shape as much as possible while avoiding voids. For example see FIG. 5B.

The α-shape segmentation having a maximum α among the α-shapes that bound the same spatial points—simplifying the α-shapes with small number of segments. In many cases, taking the maximum possible α leads to convex or almost convex shapes, which are easier to manipulate and work with. For example see FIG. 5C.

It follows that for each topological class at most three associated α-shape segmentations are selected (less when one or more of the shapes coincide), providing to the analyst with several possible shapes to choose.

Optionally, as shown at 405, breakpoint selection is directed by user selections in an interactive visualization procedure, for example user selections provide during an interactive visualization of the breakpoints. The visualization aims at making the results of the clustering accessible to users. Optionally, color is used to encode individual clusters along different hierarchy levels. Colors may be used for drawing edges between points and/or for filling color in polygonal areas bounding clusters. Colors may be used when heuristic indicates potentially interesting clustering results. For example, interesting clustering results may be results clearly showing subdivision of points to clusters and providing efficient shapes as describe in detail herein.

Figure 6A:
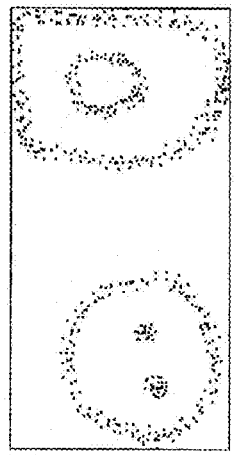
FIG. 6A-6I are exemplary α-shape based segmentations which are selected to be presented to an operator, according to some embodiments of the present invention.
Figure 6B:
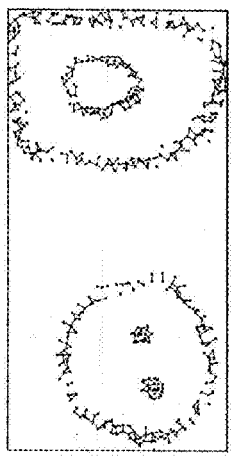
Figure 6C:
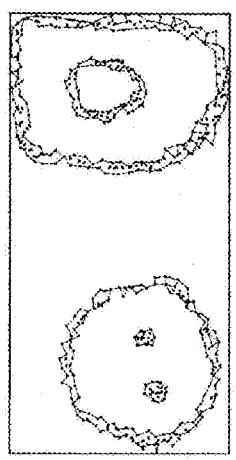
Figure 6D:
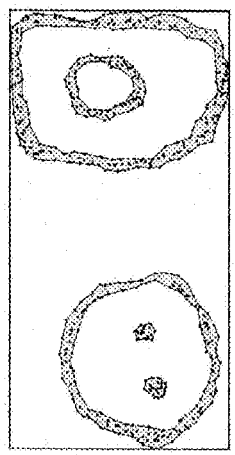
Figure 6E:
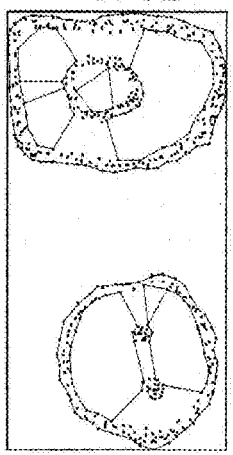
Figure 6F:
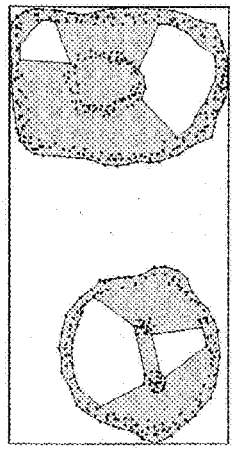
Figure 6G:
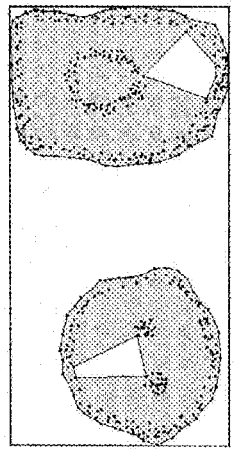
Figure 6H:
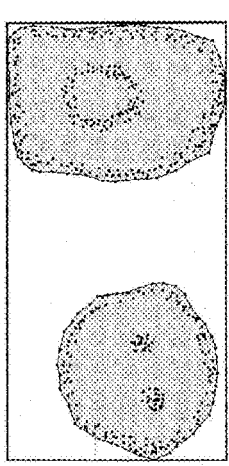
Figure 6I:
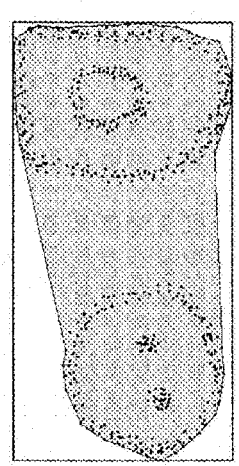

Optionally, a user interface (UI), for example a graphical user interface (GUI), allows users to interact with the topology of clusters and/or polygonal areas in breakpoint(s) presented thereto. For example, the GUI allows an operator to input instructions for reclustering and/or restructuring of polygonal area(s). Optionally, coloring is performed when instructions are accepted. The GUI optionally provides visualization that allows creating a visual feedback on the obtained clustering results and/or interacts with the breakpoint selection process. Optionally, the visual feedback provided to the operator by shaping borders and/or color filling. The shape of the borders of the polygonal areas gives the clusters a form that may be related to and fill color supports hierarchy levels information. An illustrative example of interaction with the user is described in FIGS. 6A-6I. Clusters in FIG. 6I are shapes without holes; however, subjectively, the dataset is better represented by shapes in FIG. 6D. If in a specific domain it is more intuitive to have clusters without holes, the operator may choose the clustering on FIG. 6I.

As described above, the heuristics create a set of breakpoints (at selected clustering constellations) which may be browsed through, for instance with dedicated step-forward or step-backward buttons. Optionally, corresponding α values are mapped on a sequential slider. To use interim stages, between two heuristically selected α values, a dedicated stepover button for forward and backward steps may be used, allowing the browsing through steps, for example all steps. Optionally, at any stage, users may move the slider to any α value, regardless of breakpoints.

Figure 7:
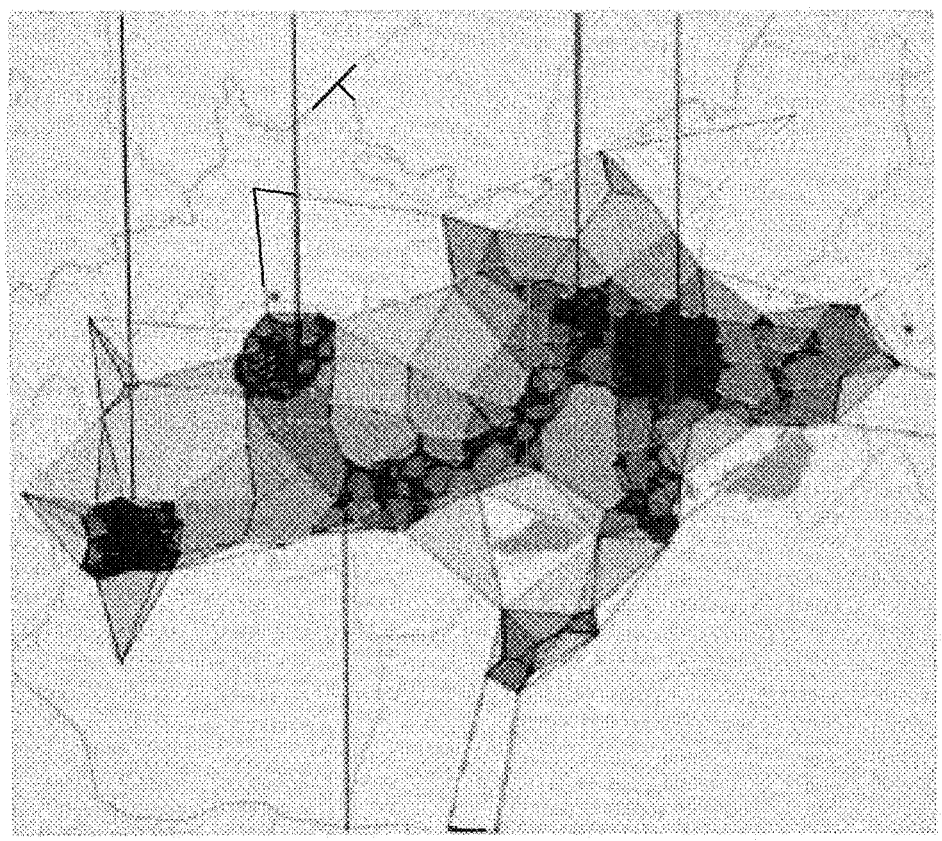
FIG. 7 depicts an exemplary α-shape based segmentation where darker spots correspond to regions used in small α values and thus reflect more dense areas and brighter colored regions correspond to regions that are less dense and thus belong to α shapes with higher α values.

As described above selected α-shape based segmentations are presented to operator(s). According to some embodiments of the present invention, various obtained cluster sets are overlaid in a number of layers where each layer adds some transparency to a map and/or color palette values. Such a map embeds the clusters in one figure in which the hierarchy is visible. For example, FIG. 7 depicts an exemplary α-shape based segmentation where darker spots correspond to regions used in smaller α-values and thus reflect more dense areas, and brighter spots correspond to regions that are less dense and thus belong to α-shapes with higher α-values.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of to ordinary skill in the art to understand the embodiments disclosed herein.

It is expected that during the life of a patent maturing from this application many relevant methods and systems will be developed and the scope of the term unit, UI, GUI, and processor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized clustering method, comprising:
receiving a spatial point dataset comprising a plurality of spatial points in a space;

heuristically calculating, using a processor, a plurality of α-shape based segmentations such that each of said plurality of α-shape based segmentations defines a plurality of polygonal areas that cluster said plurality of spatial points in a plurality of clusters which collectively bounds said plurality of spatial points;

presenting to an operator in each sequential iteration of a plurality of sequential iterations another of said plurality of α-shape based segmentations; and selecting by said operator at least one of said plurality of α-shape based segmentations.

2. The computerized method of claim 1, wherein said heuristically calculating comprises calculating Delaunay triangulation on said spatial point dataset and calculating a plurality of α-shapes based on said Delaunay triangulation, wherein each of said plurality of α-shape based segmentations is defined according to another of said plurality of α-shapes.

3. The computerized method of claim 1, wherein said heuristically calculating comprises selecting at least one of said plurality of α-shape based segmentations such that a corresponding geometric graph that represents a respective α-shape contains only simple polygonal cycles.

4. The computerized method of claim 1, wherein said heuristically calculating comprises dividing said plurality of α-shape based segmentations to a plurality of topologically equivalent classes; selecting one member of said plurality of topologically equivalent classes; wherein said presenting comprises presenting to said operator in each sequential iteration of said plurality of sequential iterations another said member.

5. The computerized method of claim 1, wherein said presenting comprises receiving from said operator instructions to adapt a topology of at least one of said plurality of polygonal areas.

6. The computerized method of claim 5, wherein said presenting comprises generating a visual feedback to said instructions.

7. The computerized method of claim 1, wherein said plurality of spatial points are plurality of objects located on a map.

8. The computerized method of claim 1, wherein said heuristically calculating comprises selecting at least one of said plurality of α-shape based segmentations such that a corresponding α value of a respective α-shape that bounds at least one of said plurality of clusters is minimal.

9. The computerized method of claim 1, wherein said heuristically calculating comprises selecting at least one of said plurality of α-shape based segmentations such that a corresponding α value of a respective α-shape defined by a minimum number of polygonal cycles has at least one of said plurality of clusters is minimal.

10. The computerized method of claim 1, wherein said heuristically calculating comprises selecting at least one of said plurality of α-shape based segmentations such that a corresponding α value of a respective α-shape that bounds at least one of said plurality of clusters is maximal.

11. The computerized method of claim 1, wherein said heuristically calculating comprises heuristically calculating a second of said plurality of α-shape based segmentations based on topological features of respective said plurality of clusters a first of said plurality of α-shape based segmentations.

12. The computerized method of claim 1, wherein said heuristically calculating comprises heuristically calculating a second of said plurality of α-shape based segmentations based on geometric features of respective said plurality of polygonal areas a first of said plurality of α-shape based segmentations.

13. The computerized method of claim 1, wherein each one of said α-shape based segmentations bounds a respective cluster from said plurality of clusters and visually marked to indicate spatial points density in said respective cluster.

14. The computerized method of claim 1, further comprising allowing a user to select any of said plurality of α-shape based segmentations before presenting at least one subsequent α-shape based segmentation from said plurality of α-shape based segmentations.

15. The computerized method of claim 1, further comprising using colors for at least one of drawing edges between points and filling polygonal areas of said plurality of polygonal areas.

16. The computerized method of claim 1, wherein said presenting comprises receiving from said operator instructions to at least one of reclustering and restructuring of some of said plurality of polygonal areas.

17. A non-transitory computer program product for computerized clustering method, comprising:
a non-transitory computer readable storage medium;
first program instructions to receive a spatial point dataset comprising a plurality of spatial points in a space;
second program instructions to calculate heuristically a plurality of α-shape based segmentations such that each of said plurality of α-shape based segmentations defines a plurality of polygonal areas that cluster said plurality of spatial points in a plurality of clusters which collectively bounds said plurality of spatial points; and
third program instructions to present to an operator in each sequential iteration of a plurality of sequential iterations another of said plurality of α-shape based segmentations;
fourth program instructions to select by said operator at least one of said plurality of α-shape based segmentations;
wherein said first, second, third, and fourth program instructions are stored on said computer readable storage medium.

18. The non-transitory computer program product of claim 17, wherein said heuristically calculating comprises selecting at least one of said plurality of α-shape based segmentations such that a corresponding geometric graph that represents a respective α-shape contains only simple polygonal cycles.

19. The non-transitory computer program product of claim 17, wherein said heuristically calculating comprises dividing said plurality of α-shape based segmentations to a plurality of topologically equivalent classes; selecting one member of said plurality of topologically equivalent classes; wherein said presenting comprises presenting to said operator in each sequential iteration of said plurality of sequential iterations another said member.

20. A clustering system, comprising:
an input module which receives a spatial point dataset comprising a plurality of spatial points in a space;
a processor;
a clustering module which uses said processor for calculating a plurality of α-shape based segmentations such that each of said plurality of α-shape based segmentations defines a plurality of polygonal areas that cluster said plurality of spatial points in a plurality of clusters which collectively bounds said plurality of spatial points;
a user interface module which presents to an operator in each sequential iteration of a plurality of sequential iterations another of said plurality of α-shape based segmentations and allows said operator to select at least one of said plurality of α-shape based segmentations.

* * * * *